(12) United States Patent
Holleczek et al.

(10) Patent No.: US 12,429,562 B2
(45) Date of Patent: Sep. 30, 2025

(54) LIDAR SYSTEM AND MOTOR VEHICLE

(71) Applicant: Robert Bosch GmbH, Stuttgart (DE)

(72) Inventors: Annemarie Holleczek, Ludwigsburg (DE); Mustafa Kamil, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 980 days.

(21) Appl. No.: 17/274,382

(22) PCT Filed: Nov. 13, 2019

(86) PCT No.: PCT/EP2019/081148
§ 371 (c)(1),
(2) Date: Mar. 8, 2021

(87) PCT Pub. No.: WO2020/114740
PCT Pub. Date: Jun. 11, 2020

(65) Prior Publication Data
US 2021/0341586 A1    Nov. 4, 2021

(30) Foreign Application Priority Data

Dec. 6, 2018   (DE) .......................... 102018221083.7

(51) Int. Cl.
*G01S 7/481*   (2006.01)
*G01N 21/55*   (2014.01)
*G01S 17/931*   (2020.01)

(52) U.S. Cl.
CPC ............ *G01S 7/4816* (2013.01); *G01N 21/55* (2013.01); *G01S 17/931* (2020.01)

(58) Field of Classification Search
None
See application file for complete search history.

(56) References Cited

U.S. PATENT DOCUMENTS 6,642,999 B2 *  11/2003  Arndt ...................... G01P 5/001
                                                         356/28
8,274,051 B1 *   9/2012  Aswell ............. H01L 31/02162
                                                       250/339.05

(Continued)

FOREIGN PATENT DOCUMENTS

CN    102232210 A    11/2011
CN    102282532 A    12/2011
(Continued)

OTHER PUBLICATIONS

International Search Report for PCT/EP2019/081148, Issued Feb. 25, 2020.

*Primary Examiner* — Luke D Ratcliffe
*Assistant Examiner* — Jempson Noel
(74) *Attorney, Agent, or Firm* — NORTON ROSE FULBRIGHT US LLP

(57) ABSTRACT

A lidar system that is configured to scan an environment with a light beam in order to acquire information regarding the environment is described. The lidar system is furthermore configured to detect both highly reflective objects in a near field of the environment and low-reflectivity objects in a far field regarding the environment. The lidar system has several photodetectors that are configured to have different saturation probabilities. A motor vehicle having a lidar system of this kind which is operatively connected to the motor vehicle, is also described.

14 Claims, 2 Drawing Sheets

(56) References Cited

U.S. PATENT DOCUMENTS

| | | | | |
|---|---|---|---|---|
| 8,878,132 B2* | 11/2014 | Hsu | | G01J 1/4228 |
| | | | | 250/338.4 |
| 9,151,865 B2* | 10/2015 | Quaiser | | G01V 8/22 |
| 2005/0046823 A1* | 3/2005 | Ando | | G01S 7/4868 |
| | | | | 356/4.01 |
| 2006/0083350 A1* | 4/2006 | Gerndt | | G01N 23/20 |
| | | | | 378/70 |
| 2010/0128109 A1* | 5/2010 | Banks | | H04N 13/296 |
| | | | | 348/46 |
| 2011/0075000 A1* | 3/2011 | Border | | H04N 25/70 |
| | | | | 348/311 |
| 2011/0188029 A1 | 8/2011 | Schmitt et al. | | |
| 2011/0279414 A1* | 11/2011 | Noma | | G02F 1/1336 |
| | | | | 345/87 |
| 2011/0304842 A1* | 12/2011 | Kao | | G01S 7/4918 |
| | | | | 356/5.01 |
| 2014/0222287 A1* | 8/2014 | Popham | | B60G 17/019 |
| | | | | 701/37 |
| 2014/0300887 A1* | 10/2014 | Yamamoto | | G01S 17/08 |
| | | | | 356/5.01 |
| 2016/0266253 A1* | 9/2016 | Kubota | | G01S 7/497 |
| 2016/0377719 A1* | 12/2016 | Moriguchi | | G01S 17/931 |
| | | | | 356/5.01 |
| 2017/0097417 A1* | 4/2017 | Wang | | H03K 3/356052 |
| 2017/0176579 A1 | 6/2017 | Niclass et al. | | |
| 2018/0003821 A1 | 1/2018 | Imai | | |
| 2018/0128918 A1 | 5/2018 | Ota et al. | | |
| 2019/0331775 A1* | 10/2019 | Song | | G01S 7/4816 |
| 2020/0116831 A1* | 4/2020 | Spiessberger | | H01Q 3/14 |

FOREIGN PATENT DOCUMENTS

| | | |
|---|---|---|
| CN | 102812346 A | 12/2012 |
| CN | 103162817 A | 6/2013 |
| CN | 103926574 A | 7/2014 |
| CN | 104603687 A | 5/2015 |
| CN | 108474850 A | 8/2018 |
| CN | 108693515 A | 10/2018 |
| DE | 9410659 U1 | 10/1994 |
| DE | 102006003785 A1 | 7/2007 |
| DE | 102014207599 A1 | 10/2015 |
| DE | 102016122712 B3 | 11/2017 |
| EP | 2300852 A1 | 3/2011 |
| EP | 3171201 A1 | 5/2017 |
| JP | 2008020203 A | 1/2008 |
| JP | 2014143690 A | 8/2014 |
| JP | 2016183922 A | 10/2016 |
| JP | 2018077088 A | 5/2018 |
| KR | 20180086895 A | 8/2018 |
| WO | 2017138370 A1 | 8/2017 |

* cited by examiner

LIDAR SYSTEM AND MOTOR VEHICLE

FIELD

The present invention relates to a lidar system that is configured to scan an environment with a light beam in order to acquire information regarding the environment, the lidar system being configured to detect both highly reflective objects in a near field of the environment and low-reflectivity objects in a far field of the environment.

The present invention further relates to a motor vehicle having such a lidar system, the lidar system being operatively connected to the motor vehicle.

BACKGROUND INFORMATION

Lidar systems and motor vehicles of these kinds are available in principle in the related art. They have, for example, an avalanche photodiode as a photodetector, for example a single-photon avalanche diode (SPAD) or instead a silicon photomultiplier (SiPM) as a photodetector. The lidar system can have a laser source for emitting the light beam. The photodetector is arranged to receive the light beam reflected from the environment. An electronic evaluation system can then obtain the information, for instance depth information, from received signals of the photodetector.

It can happen that with a large quantity of light, for instance highly reflective objects in the near field, photodetectors become saturated too quickly; or also that a low quantity of light, for instance from low-reflectance objects in the far field, becomes lost in the context of the large quantity of light.

German Patent Application No. DE 10 2014 207 599 A1, for example, relates to a photodetector, in particular for lidar systems, having individually activatable avalanche photodiodes.

The avalanche photodiodes are activated with an offset from one another in order to cover a wide dynamic range and to retain measurement capability by avoiding saturation.

German Patent No. DE 10 2016 122 712 B3 describes an optoelectronic sensor. It addresses the problem of saturation when both distant, dark objects and close-in reflective or shiny objects are to be observed. Diaphragms, amplification of a receiver, or situational adaptation of a transmitter are mentioned as possible solutions. What is proposed according to this invention is a modification of the location, size, and/or geometry of a light spot on the sensor.

German Patent Application No. DE 10 2006 003 785 A1 describes a sensor having a controllable dimming apparatus in front of an optical reception unit. It mentions the problem that a dynamic range is limited by an upper threshold above which the receiver is saturated. The dimming apparatus therefore has an electrochromic or photochromic medium in order to control the transmissivity of the dimming apparatus as a function of the radiation detected at the receiver.

US Patent Application Publication No. US 2017/176579 A describes, for example, a lidar system ("electro-optical device") made up of a laser source, a beam deflector, a photodetector, optics, and corresponding electronics. This published application describes a system that successively activates detector pixels in order to increase the signal to noise ratio of a sensor. It is apparent to one skilled in the art from this teaching that this is a micromirror-based implementation of the lidar system. The detector units are, however, temporarily active in parallel, since the lidar system furnishes not a scanning illumination pattern but a uniform ("flash") one.

U.S. Patent Application Publication No. US 2018/003821 A describes a lidar system ("object detector") made up of several light sources, a photodetector, optics, and corresponding electronics. The light sources are individually and successively activatable laser diodes. U.S. Patent Application Publication No. US 2018 003821 A describes that each light source has exactly one reception element associated with it. The pixels are read out individually and simultaneously/concurrently. The detector type can be implemented as a SPAD, and this is recited in the description as a possible embodiment; but one skilled in the art sees in the illustrations a lidar system having avalanche photodiodes (APDs).

In addition, SPAD sensor systems having red, green, and blue (RGB) color channels, and having separate photodetectors, are known in principle.

German Patent Application No. DE 94 10 659 U1 describes a reception apparatus for electromagnetic signals. The apparatus provides a time-variable attenuator for limiting the dynamic range of a signal in order to avoid saturation effects.

European Patent No. EP 3 171 201 B1 describes an optoelectronic rangefinder. An optical output power level of a light emitter is appropriately varied so as to obtain a reception signal in an intensity range which is evaluatable by a receiver unit and lies above a lower detectability limit and below an upper saturation of the reception unit.

European Patent No. EP 2 300 852 B1 describes a method for Doppler lidar measurement of speeds, in which a number of laser pulses to be integrated on a detector for each measurement occurs as a function of the intensity of the radiation coming from the medium. A dynamic range can thereby be increased.

SUMMARY

The present invention provides a lidar system having several photodetectors that are configured to have different saturation probabilities.

A lidar system according to an example embodiment of the present invention may have the advantage that both highly reflective objects in the near field and low-reflectivity objects in the far field can be detected, with no need for adaptations to the laser transmission power level or adjustable dynamic adaptations on the detector side. Compensation for excessively rapid saturation of all pixels in a context of a large quantity of light is thereby possible in simple fashion. Objects in and beyond the environment can be detected independently of their distance, for example a retroreflector in the near field, preferably, e.g., at the rear of a preceding vehicle. The detection capability of the photodetectors can always be maintained with higher probability. The present invention simplifies the provision of a lidar system having a high dynamic range.

For purposes of the present invention, the "near field" of the environment is located at a distance of between 0 m and up to 50 m, preferably up to 40 m, particularly preferably up to 30 m, measured from a photodetector of the system. For purposes of the present invention, the "far field" of the environment is located at a distance of more than 30 m, preferably more than 40 m, and particularly preferably more than 50 m, measured from a photodetector of the system.

For purposes of the present invention, the "objects" can be movable objects such as persons, vehicles, or animals; and/or immovable objects such as guardrails, walls, bridge piers, or the like.

In accordance with an example embodiment of the present invention, it is preferred that the lidar system be configured to distinguish, based on reception signals of the several photodetectors, the highly reflective objects in the near field from the low-reflectivity objects in the far field. This has the advantage that the lidar system itself can already make this distinction, and it does not need to make a downstream external evaluation only later. The lidar system can have for that purpose an electronic evaluation system that is preferably configured to evaluate dark-frame and bright-frame information in synchronized fashion, and in particular to output it in preferably synchronized fashion. The electronic evaluation system is preferably configured to statistically evaluate histograms of the photodetectors in order to ascertain predominant reflectivity properties of the objects in the environment, and preferably to correlate them in time-synchronized fashion with their distance, in particular from the photodetector.

In example embodiments of the present invention, at least one of the photodetectors has a darkening filter placed in front of it in order to decrease the saturation probability of the photodetector that is placed behind the darkening filter. The darkening filter preferably decreases the amount of light incident onto the photodetector. The darkening filter therefore decreases the saturation probability of the photodetector, so that in principle the photodetector as delivered can have any saturation probability, and the darkening filter adapts, in particular decreases, the saturation probability. All the photodetectors can therefore preferably be embodied identically, which decreases manufacturing outlay and can lower costs.

A preferred filter is a neutral density (ND) filter. ND filters, also called "gray filters," are particularly good for use as darkening filters in order to reduce the saturation probability, since they effectively decrease the amount of light incident onto the photodetector. The saturation probability of the photodetector located behind the ND filter thus decreases. The darkening filter is preferably a static optical filter. This means that a darkening performance is constant over time and is not manually or automatically controllable. This simplifies the configuration and increases reliability, since the filter does not need to have any movable diaphragms, active components, or the like. This reduces complexity and ensures high component availability. Instead of darkening filters, however, it is also possible for several photodetectors to be present which already have different saturation probabilities as delivered, i.e., do not require a preceding darkening filter. Preferably, the photodetectors can be manufactured for that purpose with detection sensitivities that differ relative to one another but preferably are static. The darkening filters for those photodetectors can then be eliminated, thus saving installation space.

Some embodiments of the present invention provide several darkening filters that are disposed in a conjoint filter matrix and constitute a conjoint filter component. A compact design, and simple handling of the darkening filters, can thereby be achievable. It is preferred that each of the darkening filters be placed in front of one of the photodetectors. Each darkening filter thus uniquely has associated with it one photodetector, which in turn can be uniquely identifiable by an electronic evaluation system. The filter matrix is preferably placed, in the optical reception path, in front of a SPAD-based detector in an SiPM configuration (SPAD array). It is particularly preferred that all the darkening filters be disposed in the conjoint filter matrix, and form the conjoint filter component. The filter matrix preferably has rows and columns, the number of rows preferably being identical to the number of columns. Preferably three or more rows and/or three or more columns are present, particularly preferably four or more rows and/or four or more columns, very particularly preferably more than five or more rows and/or five or more columns. A preferred filter matrix is correspondingly a modified Bayer filter in which darkening filters having darkening properties of differing intensity relative to one another preferably are adjacent and alternate.

The lidar system in accordance with an example embodiment of the present invention preferably has a first photodetector assemblage and a second photodetector assemblage, the first photodetector assemblage being configured to have a first saturation probability and the second photodetector assemblage being configured to have a second saturation probability, the first saturation probability being different from the second saturation probability. Highly reflective objects and low-reflectivity objects can thus each be recognized by a different one of the photodetector assemblages. Each photodetector assemblage encompasses one or several photodetectors. It is preferred that each photodetector assemblage encompass two or more photodetectors. It is preferred that all the photodetectors be identical. The first saturation probability can be defined by first preceding darkening filters that produce a first darkening effect, while the second saturation probability can be defined by second preceding darkening filters that produce a second darkening effect that is different from the first darkening effect. It is therefore preferred that a degree of darkening by way of the preceding darkening filter define the affiliation of the photodetectors with the respective photodetector assemblage. In some embodiments, however, the second saturation probability can also be defined by the light sensitivity of the photodetectors of the second photodetector assemblage itself, i.e., no second darkening filters precede the second photodetector assemblage.

In example embodiments of the present invention, the first darkening effect can be equal to between 33% and 66% with respect to the second darkening effect. The first darkening filter therefore allows passage of only between 33% and 66% of the quantity of light allowed by the second darkening filter, or the first darkening filter allows only between 33% and 66% of the maximum detection rate of the second photodetector assemblage, provided there is no second darkening filter placed in front of it. If the darkening filter is a static filter, as is preferred, the darkening effect is constant over time. Detections in photodetectors having a strong darkening filter, for instance having a darkening effect of more than 50% in terms of the incident quantity of light, can preferably be associated with a particularly bright object property, and detections in photodetectors having a weak or no darkening filter, for instance having a darkening effect of less than 50%, can preferably be associated with a dark object property, in particular by the electronic evaluation system.

It is preferred that the lidar system have a third photodetector assemblage, the third photodetector assemblage being configured to have a third saturation probability, the third saturation probability being different from the first saturation probability and from the second saturation probability. A more optimally graduated sensitivity and an increased dynamic range for the lidar system can thereby be achieved. It is preferred that all photodetectors of the third photodetector assemblage be identical to the photodetectors of the first and the second photodetector assemblage, and that only third darkening filters having a third darkening effect that differs from the first darkening effect and from the second darkening effect, or a special light sensitivity of the photodetectors which is different from the light sensitivity of the first and the second photodetector assemblage, define the affiliation of the photodetectors with the third photodetector assemblage. In embodiments, the third darkening effect is between the first and the second darkening effect, preferably centeredly therebetween. It is particularly preferred that the lidar system have at least one further photodetector assemblage, each further photodetector assemblage having a further saturation probability that is different from all others of the photodetector assemblages. A very finely graduated sensitivity and a very high dynamic range for the lidar system can thereby be achieved.

In some embodiments of the present invention, two or more of the photodetector assemblages are disposed in a conjoint detector matrix. It is preferred that two or more of the photodetector assemblages form one conjoint detector component. This has the advantage that the outlay for alignment and configuration can decrease, since it is no longer necessary to configure individual photodetector assemblages in relation to one another before initial operation, but instead two or more photodetector assemblages can be furnished as a preconfigured conjoint component. It is particularly preferred that all the photodetector assemblages be disposed in the conjoint detector matrix and form one conjoint detector component.

Preferably the detector matrix has rows and columns, the number of rows preferably being equal to the number of columns. Preferably three or more rows and/or three or more columns are present, particularly preferably four or more rows and/or four or more columns, very particularly preferably more than five or more rows and/or five or more columns. Preferably, the number of rows and columns of the filter matrix corresponds to the number of rows and columns of the detector matrix. Exact coverage of the photodiodes with the respective darkening filters can thereby be achieved in particularly simple fashion, in order to define the various photodetector assemblages.

It is preferred that the detector component and the filter component form one conjoint constituent. For example, the filter component and the detector component can be produced in highly integrated fashion in a continuous cleanroom process, and can be assembled to yield the conjoint constituent. Subsequent alignment work can thereby be eliminated. The detector component and the filter component are preferably intermaterially connected, in particular adhesively bonded, to one another in order to form the conjoint constituent. This can be a simple, inexpensive, and efficient capability for producing the conjoint constituent. In embodiments, the photodetectors are each individually encapsulated in an interior space that is formed between the filter component and detector component. Each photodetector on the detector component can thereby be well protected separately. In some example embodiments of the present invention, however, provision is made that several photodetectors are encapsulated in a conjoint interior space.

Some embodiments provide that one or several of the photodetectors are single-photon avalanche diodes. Single-photon avalanche diodes of this kind are configured to count individual photons. If too many photons are present in the optical path, the probability increases that SPADs interconnected in an SiPM will also be saturated together at the same time and thus no longer be sensitive. But because the individual darkening filters of the filter matrix transmit only as many photons as their damping graduation permits, SPADs located behind them can obtain from highly reflective objects just as many photons as in unfiltered or weakly filtered pixels in a context of low-reflectivity objects. The detection capability (also called "arm probability") thus remains homogeneous. The homogeneity becomes better, the more SPAD pixels (i.e., individual photodetectors) an SiPM (i.e., a detector matrix) possesses, and the more filter strengths (i.e., different darkening filters and thus photodetector groups) that are used. It is particularly preferred that all the photodetectors be single-photon avalanche diodes. It is thus possible to use a plurality of identical photodetectors, which can reduce costs and simplify production. The use of SPADs permits a considerable reduction in the exposure times required by commonly available imagers in poor light conditions, preferably decreased from on the order of milliseconds to on the order of nanoseconds.

In certain embodiments of the present invention, one or several of the photodetector assemblages encompass exactly one photodetector. In some embodiments of the present invention, one or several of the photodetector assemblages encompass two or more photodetectors. Preferably the number of photodetectors is the same for two or more, or all, of the photodetector assemblages. Because the affiliation of the photodetectors with the photodetector assemblages is defined, in embodiments, by the preceding darkening filter, preferably two or more darkening filters are identical in terms of their darkening effect, so that they define a photodetector assemblage having a corresponding number of photodetectors. The filter matrix preferably furnishes two or more different darkening effects, so that a corresponding number of photodetector assemblages is defined. The number of identical darkening filters in the filter matrix is furthermore the same for each of the different darkening effects. In a 3×3 filter matrix, for example, there are therefore preferably three darkening filters having a darkening effect of 33%, three further darkening filters having a darkening effect of 50%, and three further darkening filters having a darkening effect of 66%, based on the incident quantity of light, so that three photodetector assemblages can thereby be defined in a downstream 3×3 detector matrix that encompasses nine identical photodetectors. There are embodiments, however, in which comparatively stronger or weaker filters are provided in the filter matrix in a greater or lesser proportion compared with the other photodetector assemblages. For instance, a further, fourth photodetector assemblage having four photodetectors could be provided on the detector matrix, defined in the filter matrix by four further darkening filters having a 90% darkening effect. The detector matrix would then preferably have thirteen identical photodetectors.

The present invention furthermore makes available the motor vehicle of the kind recited initially, an embodiment of the lidar system described above being operatively connected to the motor vehicle.

The motor vehicle according to an example embodiment of the present invention may have the advantage that thanks to the lidar system, it can detect both highly reflective objects in the near field and low-reflectivity objects in the far field, with no need for adaptations in terms of laser transmission power level or adjustable dynamic adaptations on the detector side. The detection capability of the photodetectors can always be maintained with high probability. The present invention makes it easier to furnish the motor vehicle having a lidar system with a high dynamic range.

Preferred motor vehicles are passenger cars, commercial vehicles, two-wheeled vehicles, in particular motorcycles, and buses. In the motor vehicle the lidar system can be connected via a suitable interface to control units for at least partly automated driving functions, in particular for mono/ video partly automated driving. The motor vehicle can furthermore have 3D cameras.

Advantageous refinements of the present invention are disclosed herein.

BRIEF DESCRIPTION OF THE DRAWINGS

Exemplifying embodiments of the present invention is explained in further detail with reference to the description below and to the figures.

DETAILED DESCRIPTION OF EXAMPLE EMBODIMENTS

Figure 1:
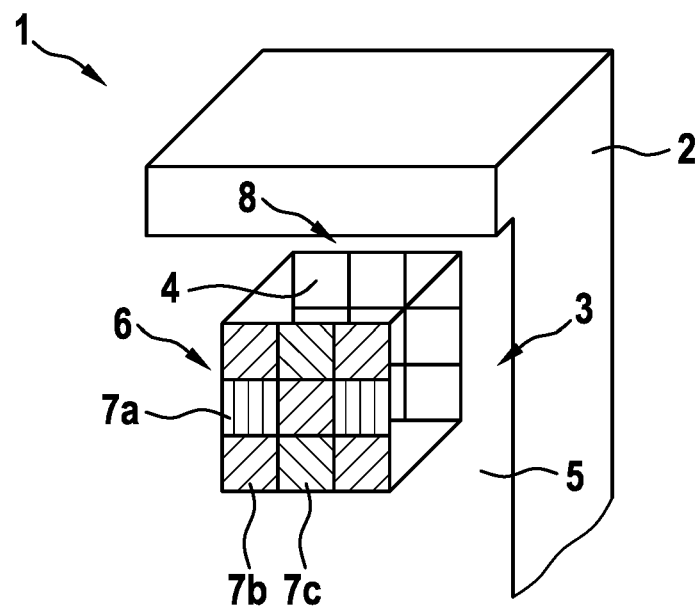
FIG. 1 shows a lidar system in accordance with a first embodiment of the present invention, having a conjoint detector matrix and a conjoint filter matrix that is placed in front of the detector matrix.

FIG. 1 shows a lidar system 1 in a first example embodiment according to the present invention. Lidar system 1 is disposed in a motor vehicle (not shown) and is operatively connected to the motor vehicle. Various details of lidar system 1 which are known to one skilled in the art have been omitted in the interest of simplification, for example a laser source that serves to emit a light beam in order to scan an environment.

Lidar system 1 depicted in FIG. 1 is configured to scan the environment with a light beam in order to acquire information about the environment, the lidar system being configured to detect both highly reflective objects in a near field of the environment and low-reflectivity objects in a far field of the environment, as will be explained in detail below.

Lidar system 1 encompasses a detector component 2 and a filter component 3. Detector component 2 encompasses several photodetectors 4, here (by way of example) nine identical photodetectors 4, that are configured to have different saturation probabilities as will be discussed below in further detail.

Lidar system 1 is configured to distinguish, based on reception signals of the several photodetectors 4, highly reflective objects in the near field from low-reflectivity objects in the far field. The near field is located here (measured from the photodetector) at a distance of approximately 0 m to 40 m, while the far field is located at a distance of more than 40 m.

In the first exemplifying embodiment shown, the individual photodetectors 4 are grouped into three photodetector assemblages that are defined by filter component 3 that is placed in front of detector component 2 in a detection direction of photodetectors 4. Filter component 3 encompasses a filter frame 5 and a filter matrix 6 having in this case once again nine darkening filters 7a to 7c, of which in each case three are identical, i.e., in each case three allow the same quantity of light to pass. Filter matrix 6 is embodied as a checkerboard-like modified Bayer filter. Darkening filters 7a to 7c that each furnish different darkening effects are disposed adjacently to one another.

Photodetectors 4 are single-photon avalanche diodes and are all embodied identically, i.e., they can only count individual photons. Darkening filter 7a-c that is placed in front of photodetector 4 decreases the saturation probability of photodetector 4 that is placed behind darkening filter 7a-c. The affiliation of photodetectors 4 with a respective photodetector assemblage therefore results only from the relative quantity of light that darkening filter 7a-c of filter matrix 6, which is located in front of the respective photodetector 4, allows to pass.

In the exemplifying embodiment shown, detector component 2 thus encompasses a conjoint 3×3 detector matrix 8 having nine identical individual photodetectors 4. Filter component 3 encompasses 3×3 filter matrix 6 having three darkening filters 7a that each furnish a first darkening effect and thus each allow 75% of the incident quantity of light to pass, three further darkening filters 7b that each furnish a second darkening effect and thus each allow 25% of the incident quantity of light to pass, and three further darkening filters 7c that each furnish a third darkening effect and thus each allow 50% of the incident quantity of light to pass. The first saturation probability that is defined by the first darkening effect, the second saturation probability that is defined by the second darkening effect, and the third saturation probability that is defined by the third darkening effect, of photodetectors 4 located behind darkening filters 7a to 7c, are thus different from one another.

Photodetectors 4 that are disposed behind the three darkening filters 7a having the first darkening effect constitute the first photodetector assemblage, which is made up here of three identical single-photon avalanche diodes. Photodetectors 4 that are disposed behind the three darkening filters 7b having the second darkening effect constitute the second photodetector assemblage, which is made up here of three further identical single-photon avalanche diodes. Photodetectors 4 that are disposed behind the three darkening filters 7c having the third darkening effect constitute the third photodetector assemblage, which is made up here of three further identical single-photon avalanche diodes. As a result of the three darkening effects of differing intensity, photodetectors 4 are configured to have, for an identical quantity of light that is incident onto each of the preceding darkening filters 7a to 7c, different saturation probabilities as compared with other photodetectors 4.

Each of the nine photodetectors 4 is thus obviously associated with exactly one of the photodetector assemblages, each of photodetectors 4 being preceded by a darkening filter 7a to 7c that allows passage of the quantity of light that is to be received by the respective photodetector assemblage. This means that a conformation of filter matrix 6 corresponds to a conformation of detector matrix 8, so that one of darkening filters 7a to 7c respectively precedes one of photodetectors 4.

In other words, FIG. 1 shows a first configuration according to the present invention that provides for detector matrix 8 an SiPM constellation made up of several interconnected SPAD detectors constituting photodetectors 4, in this case, e.g., as 3×3 "macropixels." Disposed in front of this detector matrix 8 is a static filter array (filter matrix 6) having different damping gradations in the individual pixels of the optical reception path, so that each SPAD of photodetectors 4 can count only photos of a selected dynamic range. In addition to the nine channels shown here, in other embodiments stronger or weaker darkening filters 7a to 7c can be provided in a greater or lesser proportion depending on the application.

Figure 2:
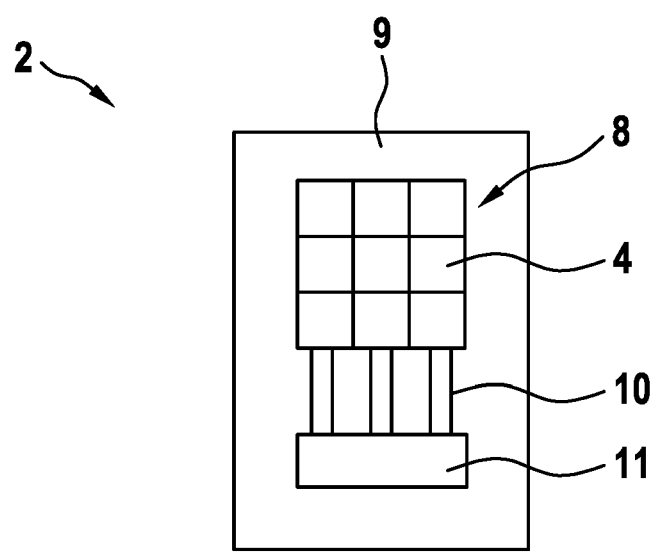
FIG. 2 is a schematic plan view of a conjoint detector component of the lidar system in accordance with the first embodiment of the present invention.

FIG. 2 is a plan view of detector component 2. Detector component 2 encompasses 3×3 detector matrix 8 that is made up of nine identical photodetectors, and a carrier plate 9 that carries detector matrix 8. Without a knowledge of filter matrix 6 it is therefore not apparent which of the nine identical photodetectors 4 is allocated to which photodetector assemblage. In other words, this means that replacing filter matrix 6 also allows the allocation of photodetectors 4 to be modified.

Each photodetector 4 is connected via an electronic conductor-path assemblage 10 to an electronic evaluation system 11 constituted, for example, by an integration evaluation control circuit. Electronic evaluation system 11 is configured to distinguish, based on reception signals of photodetectors 4 of the several photodetectors 4, highly reflective objects in the near field from low-reflectivity objects in the far field. Based on a stored allocation table, electronic evaluation system 11 knows the allocation of the individual photodetectors 4 of detector matrix 8 to the (in this case, three) different photodetector assemblages, and can thus, for instance, evaluate a count signal of a photodetector 4 that is preceded by a darkening filter 7a having a first darkening effect, constituting a reception signal from the first photodetector assemblage. In the first exemplifying embodiment, electronic evaluation system 11 is configured to combine the reception signals of all photodetectors 4 and output them in synchronized fashion as conjoint bright-frame and dark-frame data. At the same time, electronic evaluation system 11 is configured to obtain, from the reception signals of photodetectors 4, depth information regarding the environment. Each photodetector 4 thus has a dual function. Electronic evaluation system 11 is furthermore configured to record and statistically evaluate histograms of photodetectors 4, in this case, e.g., in order to ascertain reflectivity properties of objects and to correlate them in time-synchronized fashion with their distance.

In other words, FIG. 2 shows a SPAD matrix, i.e., detector component 2, in an SiPM configuration for a single macropixel, including interconnections and (if a backside-illumination SPAD/SiPM is not used) an inactive area having electronic evaluation system 11. It is important that for combined acquisition of bright-frame and dark-frame data but also simultaneously of SiPM properties (concurrent operation in the interest of redundancy of the rapidly saturatable and therefore inactive SPAD), a larger number of SPADs, i.e., photodetectors 4, than are shown here (e.g., 4×4, 5×5, etc.) must be present in the macropixel matrix (detector matrix 8).

Figure 3:
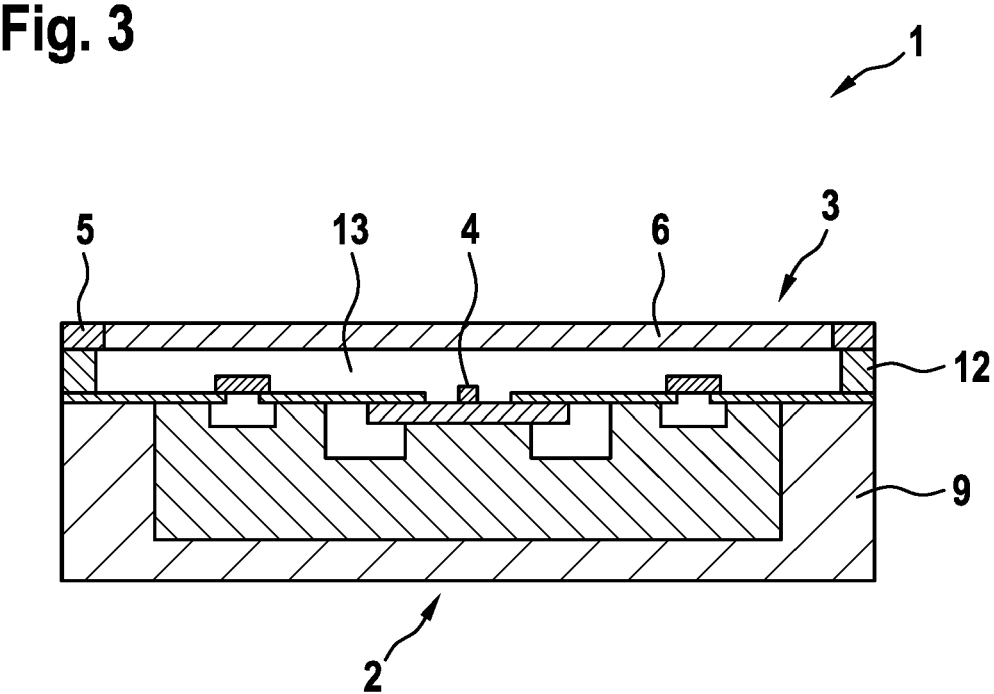
FIG. 3 is a lateral section view through a portion of the detector matrix and the filter matrix in accordance with FIG. 1.

FIG. 3 is a lateral cross-sectional view through a portion of detector component 2 and of filter component 3. Filter component 3, which has filter matrix 6, is intermaterially connected to detector component 2 that has detector matrix 8. For that purpose, filter component 3 is adhesively bonded to detector component 2 at a connecting point 12 in an edge region. Detector component 2 and filter component 3 are thus permanently connected to one another. Detector component 2 and filter component 3 thus form one conjoint constituent. Photodetectors 4 are encapsulated in an interior space 13 that is constituted between detector component 2 and filter component 3. The individual photodetectors 4 are thus protected from external environmental influences, for instance moisture. In the exemplifying embodiment shown, one photodetector 4 is respectively encapsulated individually in interior space 13. In other exemplifying embodiments, however, two or more photodetectors 4 are encapsulated conjointly in interior space 13. In other word, FIG. 3 is a sectioned illustration of an individual SPAD, i.e., photodetector 4, to depict the seamless attachment of a filter matrix 6 to the semiconductor diode (photodetector 4) in a clean-room process, for instance with the aid of intermaterial adhesive joins. An encapsulated conjoint constituent made up of detector component 2 and filter component 3 is thus created.

Figure 4:
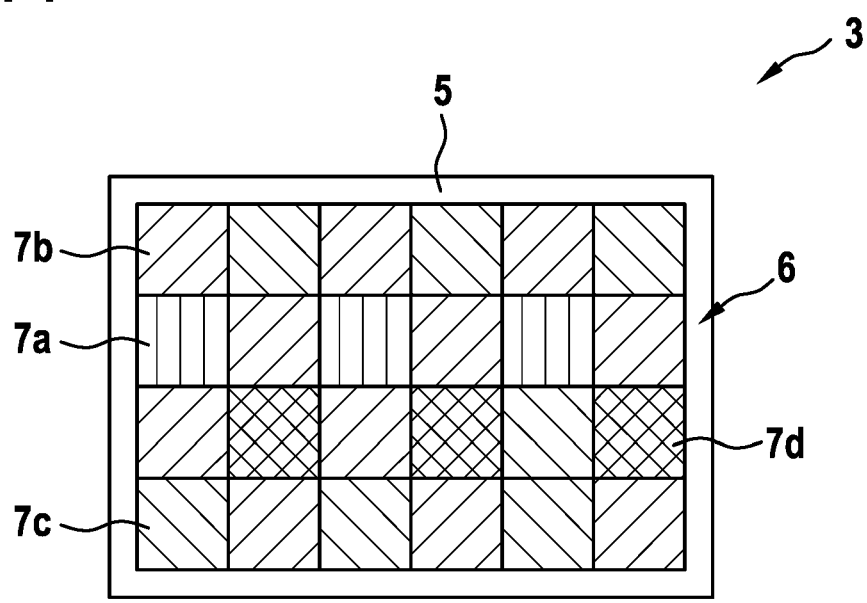
FIG. 4 is a plan view of an alternative filter matrix in accordance with a second embodiment of the present invention.

FIG. 4 is a plan view of an alternative filter matrix 6 in accordance with a second embodiment of the present invention. Filter matrix 6 is again embodied as a Bayer filter. In contrast to the first embodiment, filter matrix 6, which again is disposed in filter frame 5, is a 4×5 filter matrix 6 having four rows and five columns, i.e., twenty darkening filters 7a to 7d. Not shown is the fact that detector matrix 8 in the second embodiment of lidar system 1 correspondingly has twenty identical detectors 4 in a 4×5 detector matrix 8, so that the conformation of filter matrix 6 again corresponds to the conformation of detector matrix 8, and a darkening filter 7a to 7d of filter matrix 6 is placed respectively in front (in a receiving direction) of a photodetector 4 of detector matrix 8. Here not just three but instead four different darkening filters 7a to 7d are furnished, each of which allows a different decreased quantity of light to pass.

Lidar system 1 having the alternative filter matrix 6 of FIG. 4 thereby encompasses an additional, fourth photodetector assemblage that is configured to have a fourth saturation probability. Specifically, fourth darkening filter 7d furnishes a darkening effect that allows only a 10% quantity of light to pass. The fourth saturation probability is therefore different from the first, second, and third saturation probabilities. Photodetectors 4 that are disposed behind the three further darkening filters 7d having a fourth darkening effect constitute the fourth photodetector assemblage that is made up of three of the identical single-photo avalanche diodes. As is apparent from FIG. 4, the number of photodetectors 4 in the fourth photodetector assemblage is smaller than the number of photodetectors 4 in each of the other three photodetector assemblages in the second exemplifying embodiment. A darkening filter 7a having a first darkening effect, a darkening filter 7b having a second darkening effect, a darkening filter 7c having a third darkening effect, and a darkening filter 7d having a fourth darkening effect are labeled with reference characters by way of illustration in FIG. 4. The respective cross-hatching respectively indicates further darkening filters 7a to 7d which each allow the same quantities of light to pass, but which do not have reference characters in the interest of clarity.

The result is to furnish a lidar system 1 and a motor vehicle that is operatively connected to lidar system 1, lidar system 1 being configured to scan an environment with a light beam in order to acquire information regarding the environment. Lidar system 1 is additionally configured to detect both highly reflective objects in a near field of the environment and low-reflectivity objects in a far field of the environment, and the lidar system has for that purpose several photodetectors 4 that are configured to have different saturation probabilities. In the approach shown, photodetectors 4 are each preceded by a darkening filter 7a to 7d, so that photodetectors 4 not only are configured to count photons, but can distinguish, based on the reception signals of photodetectors 4, highly reflective objects from low-reflectivity objects. In the two embodiments shown, all darkening filters 7a to 7d are neutral density (ND) filters. Electronic evaluation system 11 can evaluate the data from photodetectors 4 and, for example, can output synchronous bright-frame and dark-frame data.

What is claimed is:

1. A lidar system, comprising:
    a lidar apparatus having a detector component, a filter component, and a laser source, which is configured to scan an environment with a light beam from the laser source to acquire depth information regarding the environment;
    wherein the detector component is configured to detect both highly reflective objects in a near field of the environment and low-reflectivity objects in a far field of the environment,
    wherein the detector component includes photodetector assemblages having photodetectors and which are configured to have different saturation probabilities,
    wherein the photodetectors are grouped into the photodetector assemblages, which are defined by the filter component that is placed in front of the detector component in a detection direction of the photodetectors,
    wherein the filter component encompasses a filter frame and a filter matrix having darkening filters, a number of which are identical to allow a same quantity of light to pass,
    wherein all of the darkening filters of the filter matrix are neutral density filters, and
    wherein adjacent ones of the darkening filters in the filter matrix have different darkening effects of differing intensity relative to one another.

2. The lidar system as recited in claim 1, wherein the lidar system is configured to distinguish, based on reception signals of the photodetectors, the highly reflective objects in the near field from the low-reflectivity objects in the far field.

3. The lidar system as recited in claim 1, wherein at least one of the photodetectors has a darkening filter placed in front of it to decrease the saturation probability of the photodetector that is placed behind the darkening filter.

4. The lidar system as recited in claim 3, further comprising:
    darkening filters, which are disposed in a conjoint filter matrix and which constitute a conjoint filter component, wherein each of the darkening filters is placed in front of one of the photodetectors.

5. The lidar system as recited in claim 4, wherein a detector component and a filter component of the lidar system form one conjoint constituent.

6. The lidar system as recited in claim 3, wherein the photodetector assemblages of the detector component includes:
    a first photodetector assemblage; and
    a second photodetector assemblage, wherein the first photodetector assemblage is configured to have a first saturation probability and the second photodetector assemblage is configured to have a second saturation probability, the first saturation probability being different from the second saturation probability.

7. The lidar system as recited in claim 6, wherein the detector component includes a third photodetector assemblage configured to have a third saturation probability, the third saturation probability being different from the first saturation probability and from the second saturation probability.

8. The lidar system as recited in claim 7, wherein at least two of the photodetector assemblages are disposed in a conjoint detector matrix and form one conjoint detector component.

9. The lidar system as recited in claim 1, wherein at least one of the photodetectors is a single-photon avalanche diode.

10. The lidar system as recited in claim 1, wherein the near field is located at a distance of approximately 0 m to 40 m, and the far field is located at a distance of more than 40 m.

11. The lidar system as recited in claim 1, wherein the darkening filters that are placed in front of a photodetector decreases a saturation probability of the photodetector that is placed behind the darkening filters.

12. The lidar system as recited in claim 1, wherein the detector component includes a conjoint 3×3 detector matrix having nine identical individual photodetectors, and wherein the filter component includes a 3×3 filter matrix having three darkening filters that each furnish a first darkening effect, three further darkening filters that each furnish a second darkening effect, and three further darkening filters that each furnish a third darkening effect, wherein the first darkening effect, the second darkening effect, and the third darkening effect are of differing intensity relative to one another.

13. The lidar system as recited in claim 1, wherein each of the photodetectors is connected via an electronic conductor-path assemblage to an electronic evaluation system.

14. A motor vehicle, comprising:
    a lidar system having a detector component, a filter component, and a laser source, wherein the detector component includes photodetector assemblages having photodetectors and which are configured to have different saturation probabilities;
    wherein the lidar system is operatively connected to the motor vehicle;
    wherein the lidar system is configured to scan an environment with a light beam from the laser source to acquire depth information regarding the environment; and
    wherein the detector component is configured to detect both highly reflective objects in a near field of the environment and low-reflectivity objects in a far field of the environment,
    wherein the photodetectors are grouped into the photodetector assemblages, which are defined by the filter component that is placed in front of the detector component in a detection direction of the photodetectors,
    wherein the filter component encompasses a filter frame and a filter matrix having darkening filters, a number of which are identical to allow a same quantity of light to pass,
    wherein all of the darkening filters of the filter matrix are neutral density filters,
    wherein adjacent ones of the darkening filters in the filter matrix have different darkening effects of differing intensity relative to one another.

* * * * *